United States Patent [19]

White et al.

[11] 4,307,529
[45] Dec. 29, 1981

[54] REMOTE CONTROL BUMPER LAUNCHER FOR TRAINING RETRIEVING DOGS

[76] Inventors: Richard L. White, 7 Bramhall St., Portland, Me. 04102; Raymond A. Lane, 419 Mount Hope Ave., Bangor, Me. 04401

[21] Appl. No.: 67,280

[22] Filed: Aug. 17, 1979

[51] Int. Cl.³ .............................................. F41C 27/06
[52] U.S. Cl. ........................................ 42/1 F; 119/29; 340/825.69
[58] Field of Search ................... 42/1 F; 119/15.6, 29; 340/694

[56] References Cited

U.S. PATENT DOCUMENTS

| | | | |
|---|---|---|---|
| 3,004,360 | 10/1961 | Johnson | 42/1 F |
| 3,063,412 | 11/1962 | Colsher et al. | 119/15.6 |
| 3,357,405 | 12/1967 | Stormon et al. | 119/15.6 |
| 3,505,926 | 4/1970 | Johnson | 42/1 F |
| 4,098,015 | 7/1978 | Walbe | 42/1 F |
| 4,181,911 | 1/1980 | Black | 119/15.6 |

Primary Examiner—Charles T. Jordan
Attorney, Agent, or Firm—Daniel H. Kane, Jr.

[57] ABSTRACT

A remote control dummy launcher or bumper launcher for training retrieving dogs, incorporating a power handle of the type designed for explosive release of gas from a blank cartridge for launching a bumper or dummy mounted on the launching arm of the power handle. The launcher includes housing means supporting the power handle, a stable base for directing the power handle at a desired angle, trigger means mounted to the housing for engaging, controlling or releasing the firing pin actuating means of the power handle whereby a dummy mounted on the launching arm may be explosively launched. Radio receiver output circuit means for controlling a power supply to said launcher and for sequentially firing a plurality of such launchers are also described.

20 Claims, 21 Drawing Figures

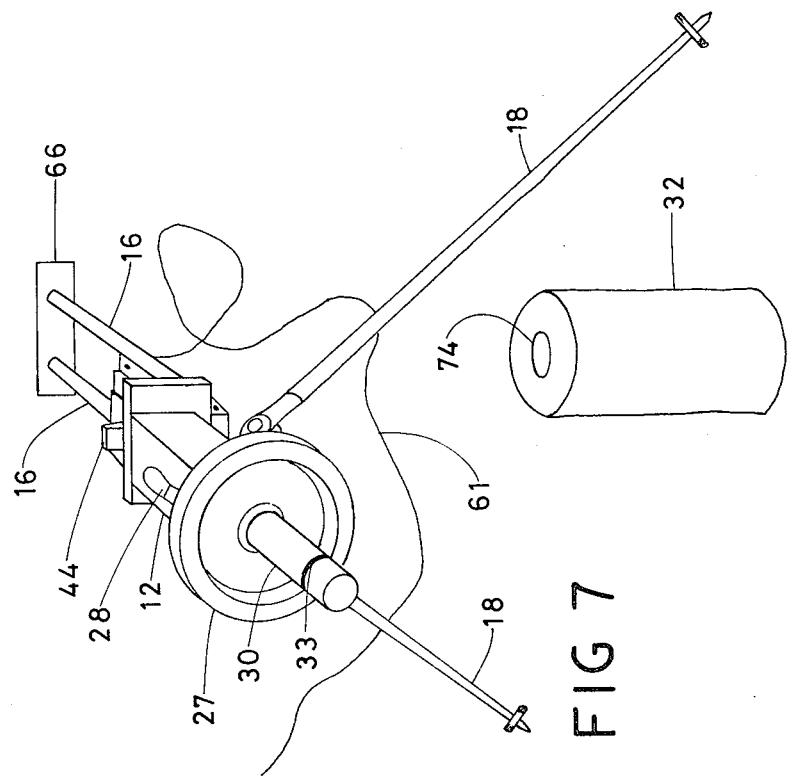
FIG 7
FIG 7A
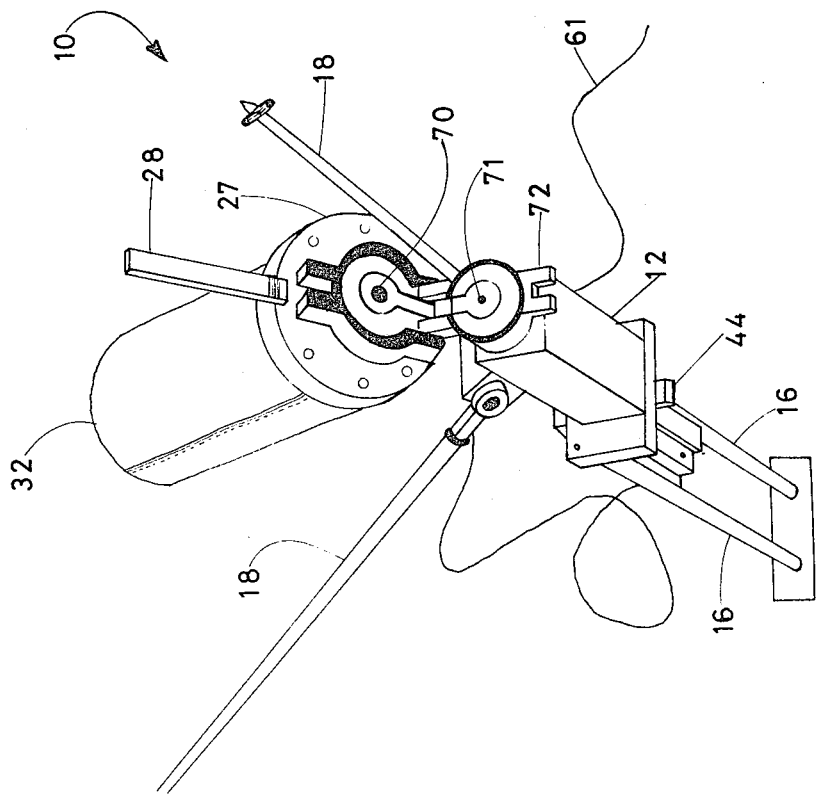
FIG 6

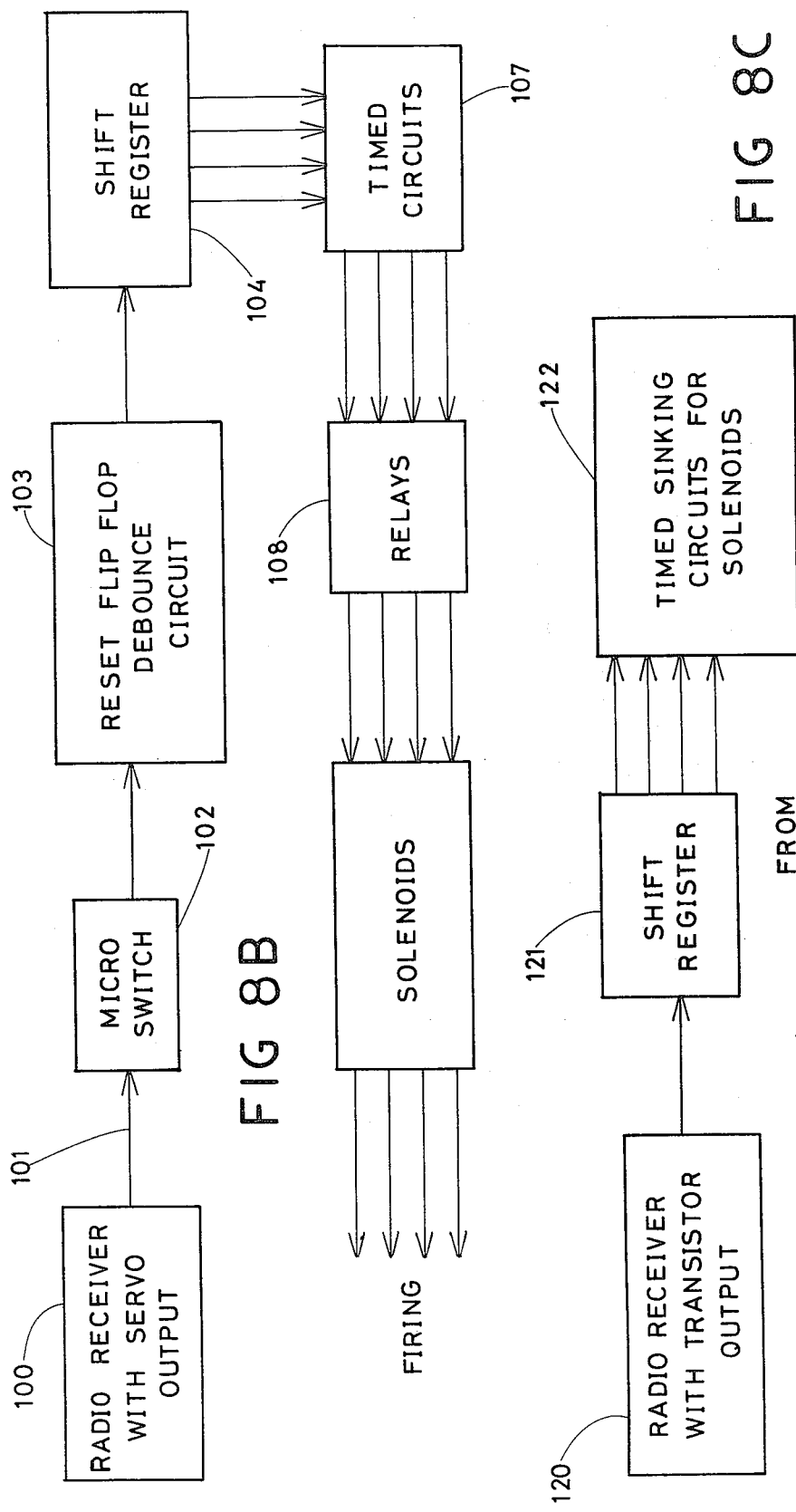

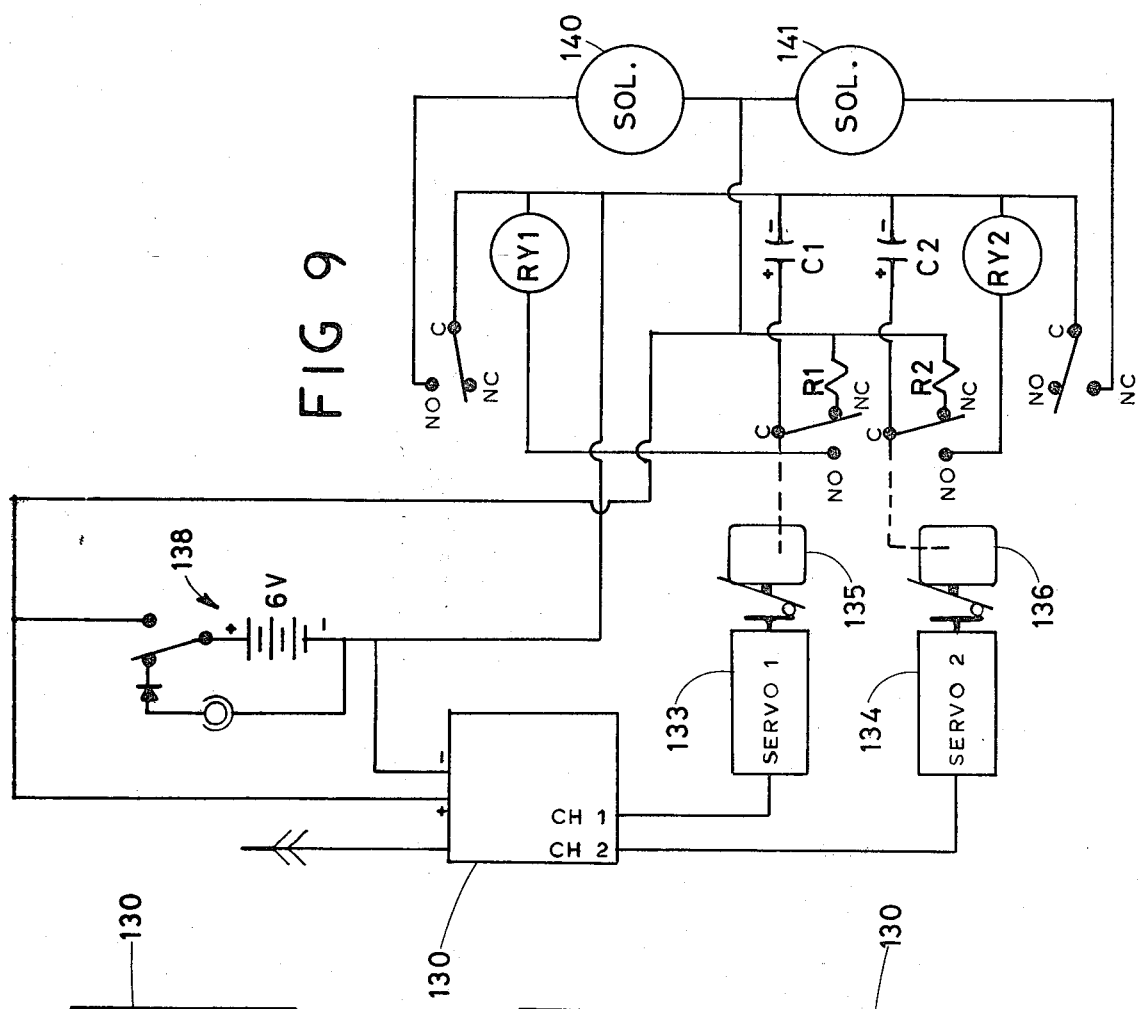
FIG 9
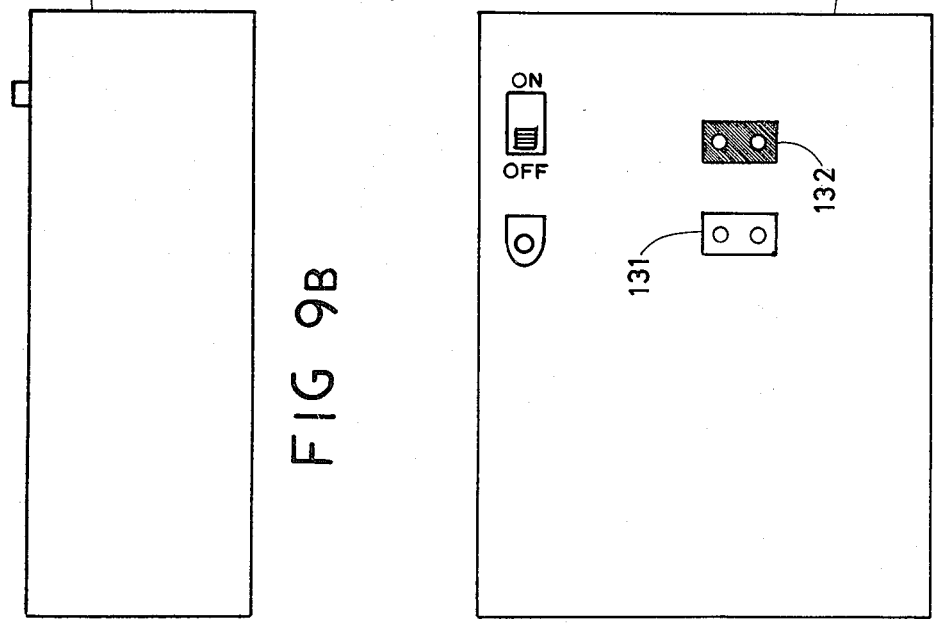
FIG 9B
FIG 9A

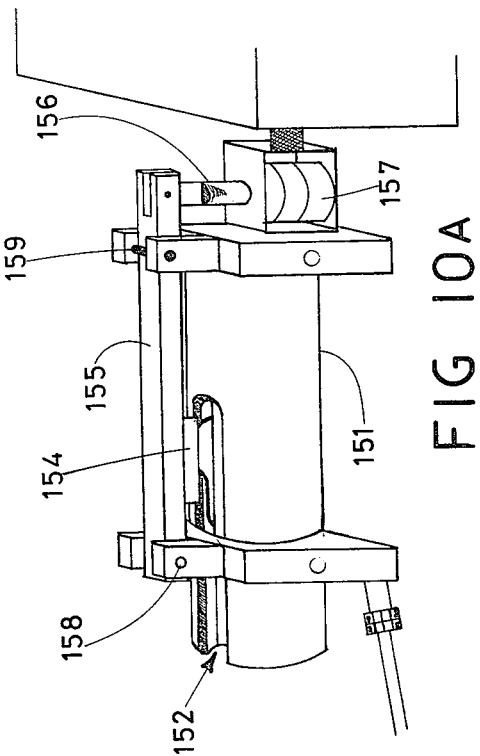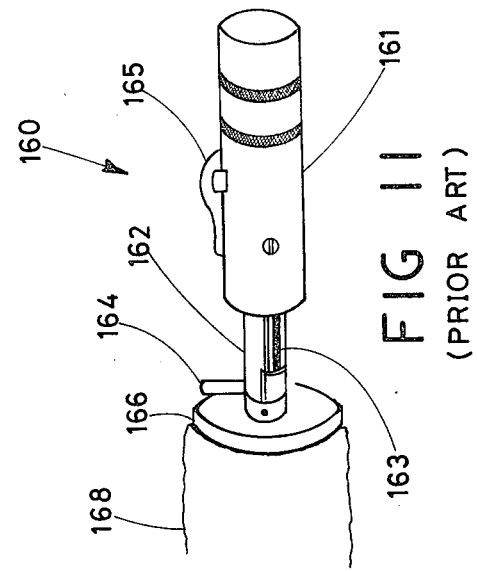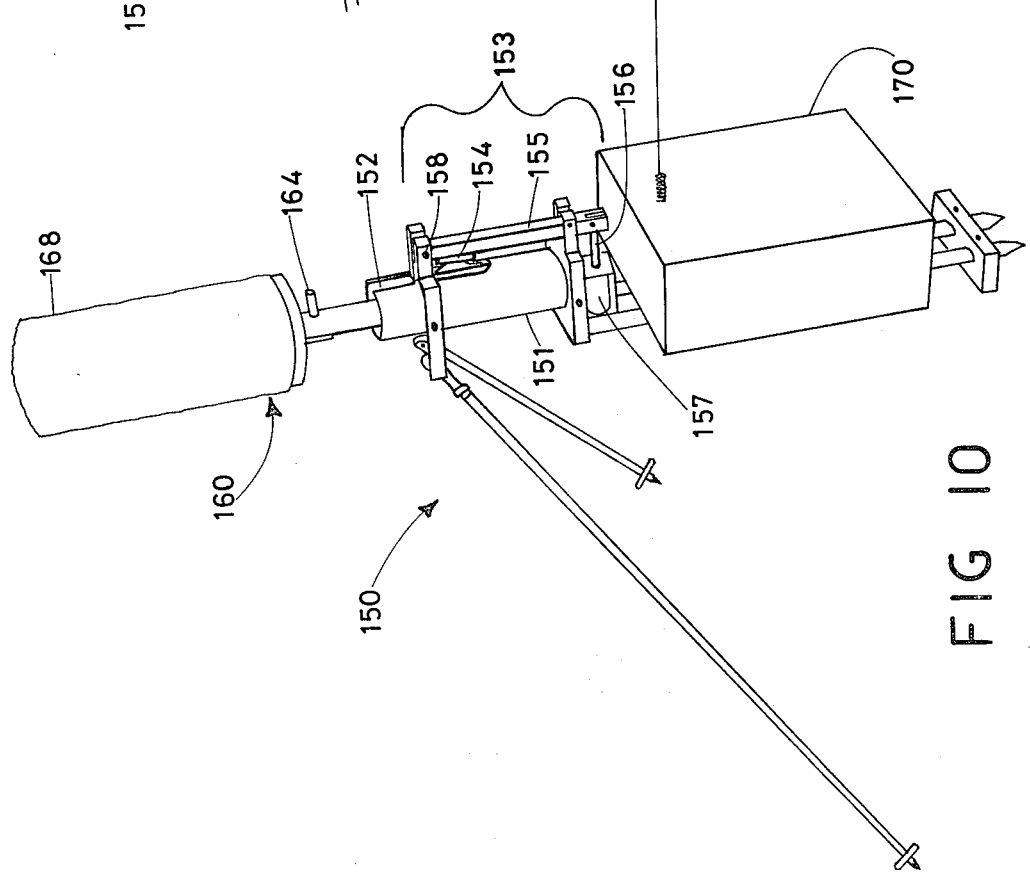

REMOTE CONTROL BUMPER LAUNCHER FOR TRAINING RETRIEVING DOGS

FIELD OF THE INVENTION

This invention relates to a new and improved remote control solenoid actuated power handle bumper launcher and to a system and radio receiver output circuitry for sequentially launching bumpers or dummies from a plurality of such bumper launchers under control of signals transmitted from a remote location.

BACKGROUND OF THE INVENTION

There are presently in use devices sometimes referred to as "power handles" of the kind illustrated in FIGS. 3 and 11 for use in training retrieving dogs. Such devices are hereafter described in detail in the specification but it may be stated generally that they are hand held devices which are manually actuated to fire, project, launch or throw an object to be retrieved known as the "dummy" or "bumper". In such conventional retrieving dog training power handles, the bumper or dummy is launched or "shot" by a 22 blank cartridge contained in a cartridge chamber of the power handle and detonated by a manually actuated spring loaded firing pin striker mechanism.

The problem with these power handle devices is that the master or trainer must hold and manually actuate the device while the dog is watching him instead of looking out into the field where the object to be retrieved would ordinarily originate. According to correct training procedures, the dog should always be looking into the field and not at the trainer when the report of the rifle is heard. Furthermore, the recoil of such hand held power handles poses safety problems for the user.

SUMMARY OF THE INVENTION

It is therefore an object of the present invention to provide a new and improved remote control ground based adaptation of the power handle bumper launcher for launching or firing dummies under control of signals transmitted from a location remote from the ground based power handle bumper launcher.

Another object of the invention is to provide a stable ground based bumper launcher in which the conventional power handle may be incorporated for remote control by transmitted radio signals.

A further object of the invention is to provide radio receiver output circuitry adapted and responsive to the output of conventional hobby type radio receivers and other readily available radio receivers for controlling and actuating the remote control bumper launcher.

A feature and advantage of these objectives achieved by the present invention is that the retrieving dog owner may incorporate into the housing and radio receiver output circuitry hardware of the present invention, already available power handles and radio receivers.

The invention also has as an objective provision of a system for sequentially controlling and firing a plurality of such power handle bumper launchers from radio signals transmitted from a remote location.

In order to accomplish these results, the present invention contemplates providing a remote control dummy launcher for training retrieving dogs using a power handle of the type formed with a cartridge chamber, firing pin means, means for actuating the firing pin mechanism for firing a blank cartridge placed in the cartridge chamber, and a launching arm designed for explosive release of gas from a blank cartridge for launching a dummy mounted on the launching arm. The dummy launcher includes housing means for supporting the power handle with the launching arm directed away from said housing, a plurality of legs coupled to said housing to provide a stable base for the housing and for directing the power handle launching arm at a desired angle from the horizontal, and means mounted to said housing for controlling and releasing the firing pin actuating means of said power handle comprising solenoid and armature means, and means coupled to said armature for engaging the firing pin actuating mechanism. A dummy mounted on the launching arm may therefore be explosively launched by a transmitted signal from a remote location by controlling current to said solenoid in response to the transmitted signal.

Thus, the invention also provides radio receiver output circuitry for controlling current from a power supply to the solenoid means. A preferred form of such output circuit comprises timed circuit means including capacitive means for conducting during the time interval of charging or discharging of the capacitor when a signal is received said timed circuit means otherwise blocking direct current; and relay means responsive to said timed circuit output for accessing current to the solenoid of the remote control dummy launcher during the time interval. A feature and advantage of this arrangement is that the power supply cannot accidently discharge over a prolonged period through the control circuit because of the capacitive element included.

In order to control a system of a plurality of remote control dummy launchers each of the type set forth above, the invention further affords radio receiver output circuitry comprising shift register means responsive to received radio signals for sequentially registering said signals, current control means responsive to registered signals from the shift register for sequentially controlling current to the solenoids of successive remote control dummy launchers of the plurality, thereby enabling sequential launching of dummies from the plurality of dummy launchers by transmissions from remote locations.

More particularly, the radio receiver output circuitry for controlling a system of a plurality of remote control solenoid actuated power handle bumper launchers according to one embodiment includes shift register means comprising a plurality of flip-flops in number at least equal to the number of remote control dummy launchers to be controlled by said radio receiver output circuit, said shift register coupled to receive and sequentially respond to the output signals from a radio receiver; timed circuit means coupled to the output of the flip-flops of said shift register, said timed circuit means including a capacitive element for conducting during the time interval of charging and discharging of the capacitor element when a signal is received from a flip-flop of the shift register, said capacitor otherwise blocking direct current; and means responsive to said timed circuit means for accessing current to the respective solenoids of the remote control dummy launchers of the system during the timed intervals.

Where a hobby type radio receiver having an electromechanical servo type output is used the invention provides micro-switch means coupled to the servo output of the radio receiver, set-reset flip-flop debounce circuit means for filtering the output of said microswitch means, with the shift register coupled to receive and sequentially respond to the output of the set-reset debounce circuit.

Where a radio receiver with a transistor output is used, the output is coupled directly to the shift register. Furthermore a plurality of Darlingtons may be coupled to sink current from a power supply through said solenoids as means for accessing current to the respective solenoids in response to signals from the shift register and timed circuit means. A feature and advantage of this arrangement is that the radio receiver output circuitry may be rendered entirely in solid state and reduced to an integrated circuit chip.

Referring to the hardware for housing, engaging and firing a supported power handle of the kind with a spring loaded retractable firing pin striker mechanism, there is provided in the preferred embodiment: first latch means connected to the end of the spring loaded firing pin striker means of the power handle, the first latch formed with an extension for applying finger or hand pressure to retract the firing pin striker means; solenoid means coupled to the housing and having an extending armature; second latch means complementary to the first latch means for engaging the first latch means and holding the spring loaded firing pin striker means in a cocked position when the firing pin striker is retracted; coupling means coupling the second latch means to said solenoid means armature; said second latch means, coupling means and solenoid armature coupled to release the first latch means and firing pin striker means upon actuation of the solenoid for firing a cartridge placed in the cartridge chamber and launching a dummy mounted on the launching arm.

In another form of hardware for housing, engaging, and firing a power handle of the type having a trigger mounted on the side of the handle, there is provided elongate tubular housing means open at the upper end for slideably receiving a power handle with the launching arm directed away from the housing, said elongate tubular housing formed with a longitudinal slot at the upper end of the housing formed to accommodate the trigger means on the side of the power handle so that the trigger means is accessible from the side of the housing; and means for depressing the trigger means of the power handle comprising solenoid means with projecting armature, said solenoid mounted to the housing, pushing means mounted to the housing and aligned with the slot in the housing and the trigger of a power handle slideably received into the housing, and means coupling the pusher means and solenoid armature whereby the pusher means depresses the trigger upon actuation of the solenoid for firing a cartridge placed in the cartridge chamber and launching a dummy mounted on the launching arm.

DESCRIPTION OF THE PRIOR ART

U.S. Pat. No. 3,357,405 is directed to a remote radio controlled pheasant release device comprising a cage adapted to spring open to release the pheasant when a latch responsive to a radio receiver mounted on the cage platform is actuated. U.S. Pat. No. 3,063,412 describes another remotely controlled bird release device, but this one actuated from a distance via an underground wire. U.S. Pat. No. 3,063,415 describes a manually operated device for releasing game bird scent, decoy, and firing sound. U.S. Pat. No. 3,303,820 describes an automatic device for casting simulated birds actuated by an approaching dog or remotely by a wired foot pedal under control of the sport. A special bird dog training shell is described in U.S. Pat. No. 2,851,991 in which a soft and yielding projectile expands from the shell casing upon emergence from the gun barrel.

None of these patents is directed to a remote control power handle bumper launcher or to a system of such bumper launchers sequentially fired by signals transmitted from a remote location, as summarized above and as set forth in more detail in the following specification, claims and accompanying drawings.

BRIEF DESCRIPTION OF THE DRAWINGS

FIG. 6 is a perspective view from above of the remote control bumper launcher with the head hingedly or pivotally opened to load a blank cartridge into the cartridge chamber.

FIG. 7 is a perspective view from above of the remote control powerhandle bumper launcher after launching of the bumper or dummy illustrated in FIG. 7A.

FIG. 8B is a block diagram and flow chart of the radio receiver output circuit illustrated in FIG. 8.

FIG. 8C is a block diagram and flow chart of an alternative embodiment of the radio receiver output circuitry using a radio receiver with transistor output.

FIG. 8D is a schematic diagram of a Darlington for sinking current through the solenoids of the remote control bumper launchers under control of the timed circuits of the radio receiver output circuitry of FIG. 8C.

FIG. 9 is a schematic diagram of the radio receiver output circuitry for a two channel hobby type radio receiver controlling two remote control bumper launchers.

FIG. 9A is a plan view and FIG. 9B a side view of the housing for the radio receiver output circuitry of FIG. 9.

FIG. 10 is a perspective view of another remote control solenoid actuated power handle bumper launcher for power handles having a trigger mechanism on the side of the handle portion of the bumper launcher.

FIG. 10A is a detailed perspective view of the portion of the bumper launcher for housing the power handle including the power handle trigger actuating mechanism.

FIG. 11 is a detailed fragmentary side view of the power handle incorporated into the remote control bumper launcher illustrated in FIGS. 10 and 10A.

DESCRIPTION OF THE PREFERRED EMBODIMENT

Figure 1:
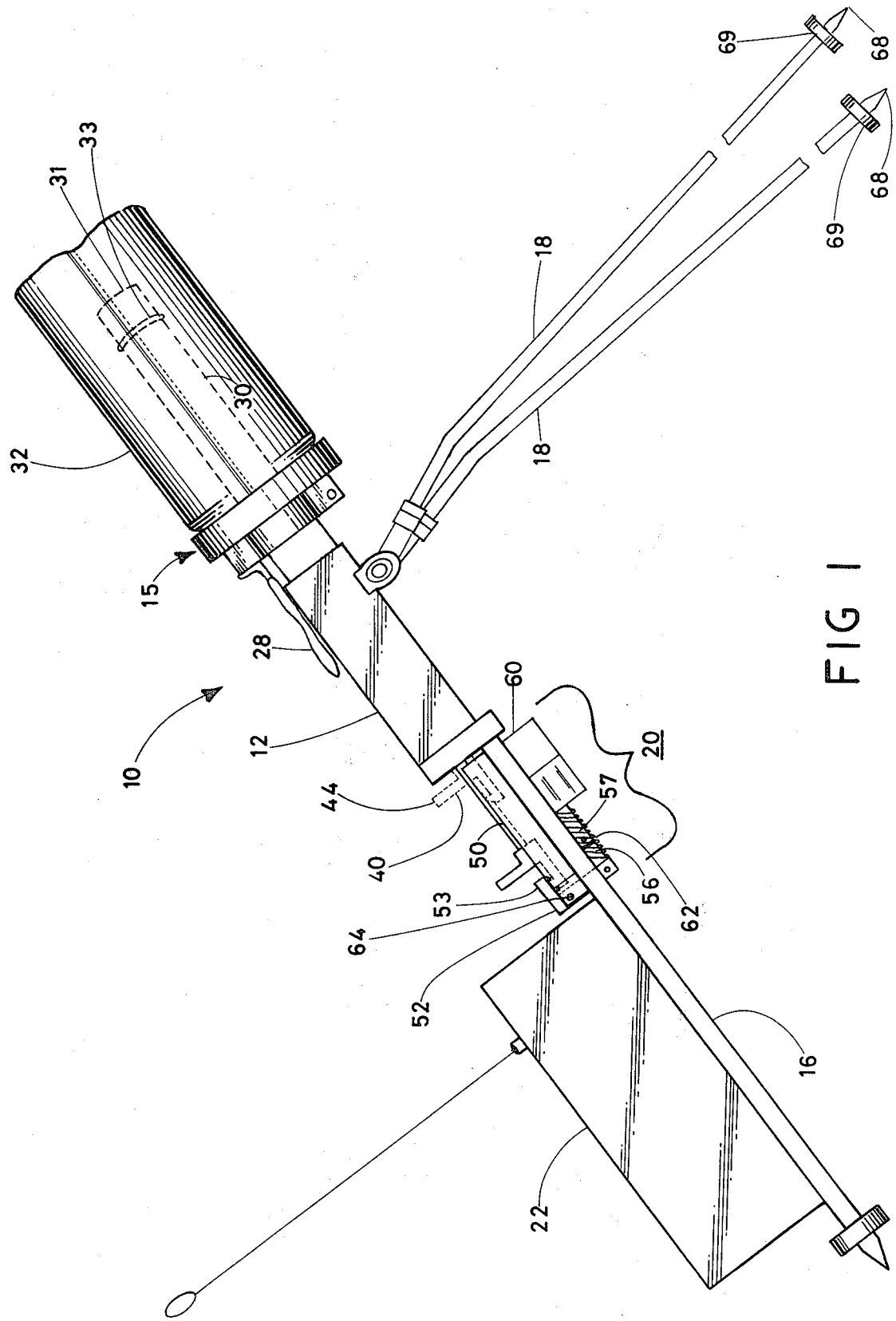
FIG. 1 is a side view of the remote control bumper launcher for training retrieving dogs in accordance with the present invention and in which the radio receiver is mounted on legs extending from the bumper launcher housing.
Figure 2:
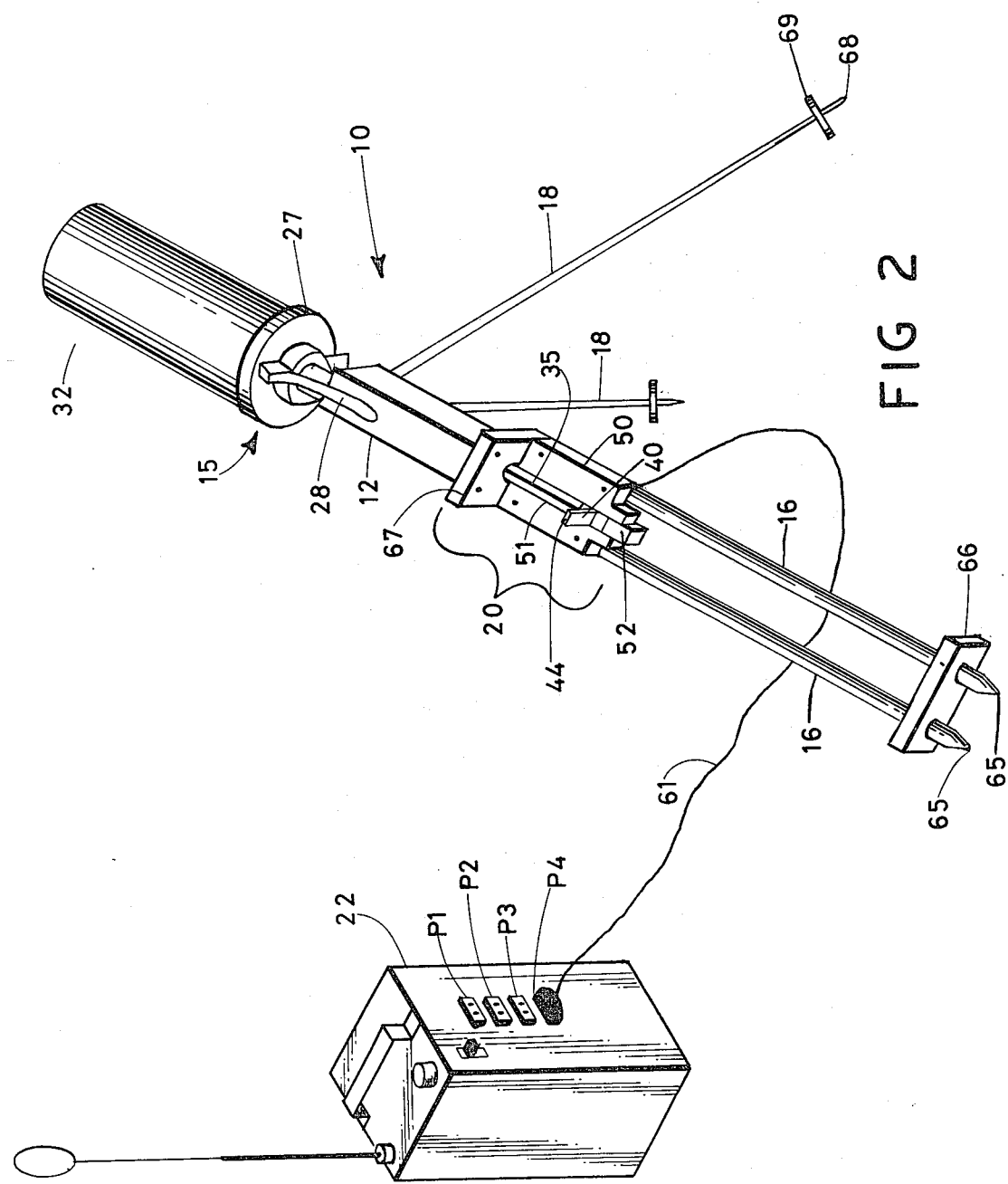
FIG. 2 is a perspective view from the rear of the remote control bumper launcher. In this example the radio receiver is free standing to avoid the effects of recoil impact on the radio when mounted directly on the bumper launcher.

A remote control bumper launcher or dummy launcher for training retrieving dogs in accordance with the present invention is illustrated in FIGS. 1 and 2. As shown in these illustrations, the bumper launcher 10 generally comprises an elongate housing 12 which securely supports a power handle 15 of the type illustrated in FIG. 3. A pair of fixed legs 16 rigidly connected to the housing 12 provides an extension of the housing for mounting additional components and for penetrating the ground and stabilizing the launcher when it is positioned at a remote site. A pair of pivotally mounted legs 18 coupled to the housing permit adjusting the angle or attitude of the launcher 10 from the horizontal as required for range and terrain. Mounted to the housing 12 and housing extension legs 16 is firing pin actuating mechanism 20 hereafter described in detail. A radio receiver and output circuit 22 receives signals transmitted from a remote location and controls operation of the firing pin actuating mechanism 20 which has been previously cocked or retracted as hereafter described. The difference between the arrangements of FIGS. 1 and 2 is that in FIG. 1 the radio receiver and output circuit 22 is mounted on the launcher extension legs 16 while in FIG. 2, the radio receiver and output circuit 22 is placed separately on the ground to isolate the electronics from the recoil impact of the launcher.

Figure 3:
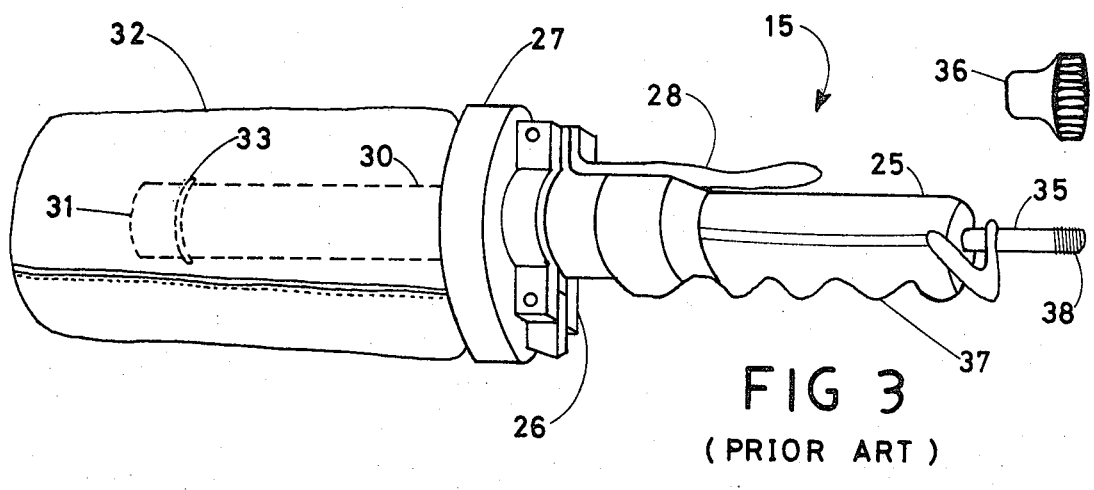
FIG. 3 is a side view of the power handle incorporated into the housing of the remote control bumper launcher illustrated in FIGS. 1 and 2, and showing the knurled knob removed from the end of the retractable, spring loaded, firing pin mechanism.

Referring at the same time to FIG. 3, the power handle 15 is of the type commercially available and well known to retriever dog trainers and hobbyists. For example, the illustrated model is available from Tidewater Specialties, U.S. Route 50, Box 158, Wye Mills, Maryland, 21679 under the trademark "Deluxe Retriev-R-Trainer" Outfit. The elements of the power handle include a handle portion 25 pivotally mounted by hinge 26 to a head portion 27. The head portion 27 can be opened and separated from the handle portion 25 on hinge 26 using the loading handle 28 which lifts up to open the head from the handle for loading a blank cartridge in the head of the power handle. The head portion 27 includes a launching arm 30 which explosively releases gas at its tip 31 from the detonation and firing of a blank cartridge loaded in the head, for launching a bumper or dummy 32 mounted on the launching arm 30. O-ring seal 33 prevents back release of the exploding gas confining it for launching the dummy 32. The bumper 32 is typically a canvas covered dummy suitable for long wear and dog appeal and includes a central mounting shaft for complementary snug fitting over the launching arm 30 and O-ring seal 33 of the power handle. The power handle also includes a spring load firing pin or firing pin striker 35 at the end of which is normally fixed a knurled handle 36 for retracting the firing pin striker 35 and releasing it to detonate a blank cartridge previously loaded in the head of the power handle. The term "firing pin striker" is intended to include both a unitary firing pin arrangement or a firing pin and impact striker arrangement in the power handle firing pin mechanism.

In order to adapt this power handle model for use in the embodiment of the present invention here described, the knurled handle 36 is removed from the firing pin or firing pin striker 35. The handle grip 37 may also be removed leaving the shaft and firing pin striker 35. The handle portion 25 of power handle 15 is then enclosed securely and fixed within the housing 12 of the launcher 10, rigidly mounting the power handle with launching arm 30 directed away from the housing 12.

Figures 4, 4A:
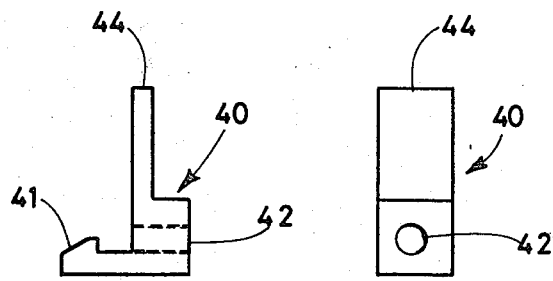
FIG. 4 is a side view and FIG. 4A a front view of the latch or catch piece mounted at the end of the firing pin mechanism of FIG. 3 in place of the knurled knob.

In place of the knurled knob 36 previously removed from the end of firing pin striker 35 a catch or latch piece 40 as illustrated in FIGS. 4 and 4A is attached to the end. The catch or latch piece 40 with hooked extension 41 can be fixed to the end of the rod 35 by, for example, threading the end 38 of the rod and internally threading the wall 42 of the hole formed in catch 40. Catch or latch 40 is formed with finger extension 44 to permit engaging and retracting the spring loaded firing pin striker 35 with the finger or hand for cocking the firing pin actuating mechanism 20 as hereafter described.

Figures 5, 5A:
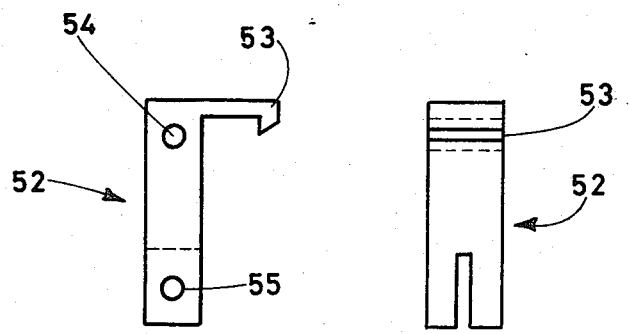
FIG. 5 is a side view and FIG. 5A a front view of the complementary latch or catch piece which functions as a pivot trigger to retain and release the latch piece of FIG. 4 and the firing pin striker mechanism.

Referring again to FIGS. 1 and 2, a firing pin or trigger actuating mechanism 20 is mounted to the housing 12 and housing and housing extension legs 16 and includes a platform formed with a central guideway or groove 51 formed to contain and guide travel back and forth of the catch 40 fixed to the end of firing pin striker 35. In both FIGS. 1 and 2 the firing pin means or striker 35 is in cocked position, that is fully retracted from the housing and with hook 41 of catch 40 engaging and held by the complementary hook 53 of latch or pivot trigger 52 mounted at the lower end of the guideway 51 of platform 50. The complementary catch, latch or pivot trigger 52 is shown in more detail in FIGS. 5 and 5A. This pivot trigger is pivotally mounted at the hook end through hole 54 to the platform 50 in the lower end of groove or guideway 51. Pivot trigger 52 is pivotally mounted at its other end through hole 55 to coupling arm 56 which is in turn linked or coupled to the armature 57 of solenoid 60 mounted between the legs 16 to the bottom of platform 50.

The power supply for solenoid 60 is actuated by a signal from the output of radio receiver and output signal processor 22 which in the case of the launcher illustrated in FIG. 1 is mounted directly on the legs 16 of the launcher and in the example of FIG. 2 is a separate component placed separately on the ground adjacent to the launcher 10 with output coupled to drive the solenoid through extension wires 61. With the firing pin actuating mechanism in cocked position, hook 53 of pivot arm trigger or latch 52 engages the hook 41 of latch 40 holding the spring loaded firing pin striker 35 in retracted position as shown in FIGS. 1 and 2. When the solenoid 60 is actuated by current under control of the radio receiver and output circuitry hereafter described, the armature 57 retracts against the tension of spring 62 pulling the coupling arm 56 which is in turn pivotally mounted to the catch or pivot trigger 52, whose hook 53 turns out on the axis 64, disengaging the hook 41 of catch 40 releasing the spring loaded firing pin striker 35, detonating the blank cartridge in the head of the power handle and launching the bumper or dummy 32.

Further details of the described embodiment illustrated in FIGS. 1 and 2 are as follows. The legs 16 rigidly extending from the housing 12 are parallel and spaced apart for stability and for mounting of components, joined at one end by spacing member 66 and at the other end by member 67 joining the platform 50 to the housing 12. The ends of the legs 16 are tapered to form pointed tips for penetrating the ground while spacing member 66 limits the depth of penetration, but at a depth sufficient to afford the stability for firing. Swivel mounted legs 18 are similarly tapered to points 68 at the tips with flange stops 69 above the ends to limit depth of penetration into the ground when the launcher is set at a remote location.

FIGS. 6 and 7 provide additional clarification of the cartridge loading and bumper launching steps of the bumper launcher 10. FIGS. 6 and 7 illustrate the same embodiment described above and corresponding numbers are utilized. FIG. 6 shows the head 27 of the power handle hingedly raised by means of loading arm 28 for loading a blank cartridge in cartridge chamber 70. Also visible is the tip 71 of the firing pin which detonates a cartridge loaded in chamber 70 when the firing pin actuating mechanism is triggered as heretofor described. After the cartridge is loaded, the head 27 swings down and the handle 28 locks the head in closed position against the neck 72 at the top of the housing. The appearance of the launcher 10 after explosive launching of the bumper or dummy 32 is shown in FIG. 7. Here the appearance of the head 27 of the power handle incorporated in the launcher, launching arm 30 and O-ring seal 33 are clearly shown with the bumper 32 and mounting channel 74 shown in FIG. 7A.

Figure 8:
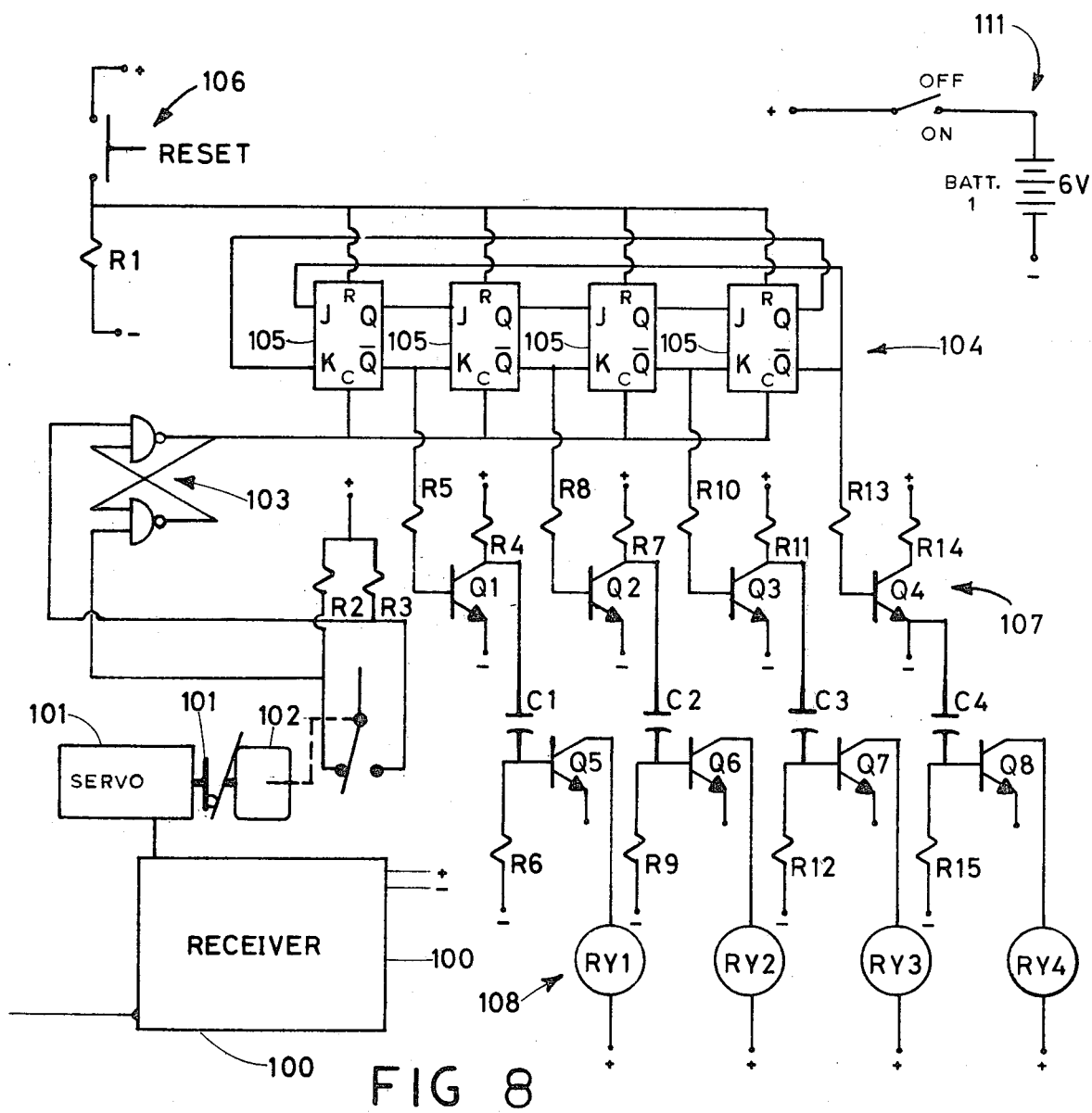
FIG. 8 is a schematic diagram of the radio receiver output circuit for sequentially controlling and firing a plurality of bumper launchers at a location remote from the transmitted control signals.

Radio receiver output circuits for controlling the solenoid and actuating the firing pin mechanism of a launcher to launch dummies at remote locations are illustrated in FIGS. 8 and 9. FIG. 8 illustrates a system for sequentially controlling a plurality of bumper launchers, in this case, four such launchers set up at the location remote from the radio transmitter held by the trainer. The radio receiver and output circuits illustrated in FIG. 8 are housed in, for example, the box 22 of FIG. 2. The radio receiver output circuit controls the power supply for the solenoids and permits current to pass from the power supply to the appropriate solenoid when a relay is closed in the power supply circuit. The power supply and circuit for actuating the solenoids is also contained in the box 22 and is illustrated in FIG. 8A.

Figure 8A:
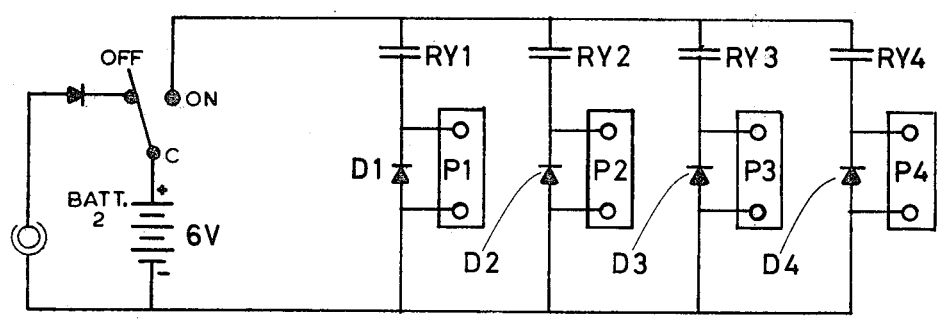
FIG. 8A is a schematic diagram of a power supply circuit controlled by the relays of the radio output circuit of FIG. 8.

In this embodiment, the solenoid power supply comprises the rechargeable 6 volt battery designated BATT 2 of FIG. 8A which can be switched between a recharging circuit on the one hand and the four parallel solenoid supply circuits blocked by normally open relays RY1, RY2, RY3, and RY4. Each normally open parallel relay is coupled in series with a corresponding one of the plug receptacles P1, P2, P3 and P4 into which are plugged the extension wires for the solenoids of the four bumper launchers to be actuated in controlled sequence at the remote location. Diodes D1, D2, D3 and D4, coupled respectively across the terminal of plug receptacles P1, P2, P3, and P4 prevent spike voltages originating at the solenoids from ringing back and damaging the circuits of FIG. 8, hereafter described. Each of the relays RY1, RY2, RY3 and RY4 is sequentially closed under control of the radio receiver output circuits of FIG. 8 when sequential signals are received from the trainer transmitting from a distance.

While the system for multiple launchers set forth in FIG. 8 by way of example controls four launchers, it is apparent that the circuitry of FIG. 8 can be repeated or contracted for any number of launchers. The radio receiver 100, housed in box 22 in this embodiment is a hobby type radio receiver with a servo or rotational motion mechanical output characteristic of the hobby type receivers and with the transmission preferably in the hobby band of the 72 megahertz range, avoiding interference with the lower frequency CB bands. For example, a Futaba brand hobby receiver with servo output may be used in the present example.

As shown in FIG. 8 and corresponding block diagram in FIG. 8B, the servo or rotational motion output 101 of receiver 100 is coupled to a micro-switch 102 whose intermittent output is in turn coupled to the set-reset flip flop 103 which functions as a "debounce circuit" for the microswitch. Thus, the debounce flip-flop 103 responds to the initial change or flip of the microswitch but not subsequent vibrations characteristic of such switches. This prevents the subsequently coupled shift register 104 from responding to the vibrations of the microswitch when it is switching. In effect, the set-reset flip-flop filters out the vibrations of the microswitch. The sequential output of the debounce flip-flop 103 provides one of the control signals to each of the JK flip-flops 105 comprising shift register 104. Shift register 104 functions to pass a 1 sequentially down the shift register flip-flops with each signal from the debounce circuit 103. The shift register flip-flops are then reset for a new round by reset button 106.

Each JK flip-flop 105 of the shift register 104 controls a different relay corresponding to a different solenoid of the four launchers which may be coupled to the radio receiver and output circuits through plug receptacles P1, P2, P3, and P4. This is accomplished by coupling the respective outputs of the four shift register JK flip-flops through timed circuits collectively designated 107 in turn respectively coupled to the four relays RY1, RY2, RY3 and RY4 collectively designated 108.

By way of example, for the first output control circuit the output of the first JK flip-flop in the shift register is coupled through transistor Q1 to capacitor C1 and then through transistor Q5 to the relay RY1. Operation of this output control circuit is as follows. When a logic 0 is in the JK flip-flop so that the corresponding launcher should not be firing, the output Q of the JK flip-flop will be 1 or voltage high. This output voltage delivers current to the base of Q1 driving it to conduction. Conducting from its collector to emitter it thereby clamps the capacitor C1 to ground and transistor Q5 receives no signal. Relay RY1 therefore remains in its normally open position and no current is delivered from the solenoid power supply BATT 2 to the solenoid of the first launcher.

When the first JK flip-flop of the shift register switches to a logic 1 as a result of combined signals from the debounce flip flop 103 and the feedback from the output of the last flip-flop of the shift register, Q goes to zero and the transistor Q1 becomes non-conducting. C1 is no longer clamped to ground and current flows into the capacitor. During the timed interval while capacitor C1 charges, current is delivered to the base of Q5 and it becomes conducting for the interval of charging of C1. The relay RY1 therefore becomes conducting during the interval and permits current to pass from the solenoid power supply to the solenoid of the first launcher, triggering the firing pin actuating mechanism, detonating the cartridge and launching a bumper. The capacitance of C1 and resistance of R6 are selected to give an RC time constant of, for example, 1 second, during which time current flows and the power supply battery BATT 2 delivers 2 amps of current to drive the solenoid. By way of example, the capacitance of C1 may be 470 microfarads and the resistance of R6, 1K ohms. The foregoing description applies to each of the control circuits from the output of each of the shift register JK flip-flops. Thus, the second shift register output is coupled to transistor Q2 which in turn controls capacitor C2 in turn coupled to transistor Q6 which controls relay RY2. When closed, RY2 would permit power supply current to flow for the timed interval of one second to the second solenoid mounted on the second launcher for explosive launching of the second bumper or dummy.

The designation of + and − on the circuit diagram refers to the power supply 111 for the transistor output circuits comprising the 6 volt battery designated BATT 1. Base resistors R5, R8, R10 and R13 for Q1, Q2, Q3 and Q4 are selected in this example to be 10K ohms while the collector resistors are 1K ohms. The time constant resistors R6, R9, R12 and R15 are also 1K ohms in this example to give the desired time interval with capacitors C1, C2, C3 and C4 each selected to be 470 μf. Transistors Q5, Q6, Q7 and Q8 function as inverting buffer transistors in that when conducting they sink current from high voltage through the respective relays.

A feature and advantage of the timed capacitive control circuits for sequencing the launchers is that the capacitance normally blocks DC and conducts only when the capacitor is charging. Power supply batteries will not continue to discharge because the relay can only be closed during this charge cycle. The circuit can conduct only for the timed interval of the RC time constant.

An alternative to the circuit illustrated in FIGS. 8 and 8B is presented in FIG. 8C. According to this embodiment of the invention, a different radio, which provides a transistor output is used for the remote control receiver. This simplifies the circuitry because the electromechanical output through a servo is eliminated. Therefore, the output of radio receiver 120 with transistor type output is fed directly to the shift register 121. Another simplification of the circuitry involves replacement of the relays RY1, RY2, RY3, and RY4 and inverting buffer transistors Q5, Q6, Q7, and Q8 with Darlington transistor current sources 125, FIG. 8D, coupled to sink current from high voltage through the solenoids, when the Darlingtons are driven to conduction by a signal from the shift register through a timed circuit capacitance. The combination of timed circuits and Darlingtons 125 might be characterized, therefore, as timed sinking circuits 122 for the solenoids 123 which control firing of the respective mechanisms. The Darlingtons are only conducting during the interval of the RC time constant built into the circuit again protecting the power supply from discharging unintentionally. Thus, any one of the four Darlingtons will only see a signal and become conducting when its corresponding timed circuit capacitor is charging as a result of a 1 appearing in the corresponding JK flip-flop of the shift register.

It is apparent that with the modifications of FIG. 8 described with reference to FIGS. 8C and 8D, the output circuit can be completely reduced to solid state integrated circuitry, for compact plug in with the radio receiver. Similarly the circuit of FIG. 9 can be simplified for integration.

A two channel radio receiver for separate control of two remote launchers using the two separate channels without the shift register sequencing of FIG. 8 is illustrated in FIGS. 9, 9A and 9B. The two channel radio receiver 130 such as a two channel Futaba hobby type radio receiver includes plug receptacles 131 and 132 for extension wires to two launchers and their respective solenoids. The radio receiver is provided with two mechanical outputs in the form of servos 133 and 134. Microswitches 135 and 136 are coupled respectively to these outputs. In this embodiment, the microswitches are operated in the normally closed mode, clamping the capacitors to the power supply voltage 138 in one direction. When the switch position changes the discharge of the capacitor, either C1 or C2 through relay RY1 or RY2 respectively couples the power supply current to the solenoid 140 or solenoid 141 respectively for the duration of the time interval. The impedance of the respective relay coil determines the time delay in combination with the respective capacitor C1 or C2. Again, this circuit may be modified by replacing the relays with Darlingtons.

For a single remote control launcher the radio receiver output circuit would be, for example, the same as one of the channels of the two channel arrangement described above. The circuit alternatively may utilize a Darlington in place of the relay.

Another embodiment of the remote control bumper launcher for training retrieving dogs is illustrated in FIGS. 10 and 10A. This form of the invention is adapted for remote control firing of power handles of a different type than that incorporated in the launchers of FIGS. 1 and 2. According to the form of the invention here presented, the launcher is adapted to incorporate power handles used by dog trainers and hobbyists which have a trigger mechanism on the side of the handle adapted to be pressed for firing a cartridge placed in the cartridge chamber when the power handle mechanism is cocked. Such a power handle, for example is the Remington Model H-45 Power Handle for firing 22 blank cartridges.

Such a power handle 160 is illustrated in FIG. 11 and includes a handle portion 161, neck 162 and head 166 which includes the launching arm on which is mounted bumper or dummy 168 for explosive launching. The neck portion includes a sliding bolt which can be retracted by arm 164 to cock the spring loaded firing pin and afford room to load a cartridge into the cartridge chamber (not shown) in the head of the power handle. The bolt is then returned home against the cartridge to guide the spring loaded firing pin striker, upon pressing trigger 165 against the handle portion 161 of the power handle 160.

Because of this arrangement of the power handle in the embodiment of the invention illustrated in FIGS. 10 and 10A the launcher 150 is formed with a power handle support tube or housing 151 in which the power handle 160 is placed and inserted to rest against the base of the tube. The power handle tube or launching tube 151 is formed with a slot 152 with which the trigger 165 is aligned as the handle portion 161 of power handle 160 is slid into the tube. Thus, the trigger 165 slides down the slot 152 and projects beyond the cylindrical tube or housing 151, to the end that it may be depressed appropriately by the pusher 154 of the trigger actuating mechanism 153 mounted on the power handle support tube or housing 151. In this case the trigger actuating mechanism consists of the pusher 154 positioned in alignment with the trigger of a power handle placed in the launching tube 151 for depressing the trigger under motion by the pivot arm 155 which pivots inwardly on axis 158 when pulled at its other end by the armature 156 of solenoid 157 mounted below the base of tube 151 and with its armature axis perpendicular to the axis of the launching tube. Motion outward of pivot arm 155 and armature 156 is constrained by stop 159. The legs supporting the launcher are similar to those heretofore described with reference to the form of the invention illustrated in FIGS. 1 and 2 and the radio receiver and output signal circuitry for controlling the power supply to the solenoid can be mounted on the rigid legs or separately rested on the ground with extension wire running to the solenoid.

In operation of the launcher 150, a radio signal picked up by the receiver and output circuitry heretofore described provides an output accessing the power supply current to solenoid 157 which retracts its armature 156 which in turn pulls pivot arm 155 toward the tube. Pusher 154 mounted beneath the pivot arm and aligned with the trigger of the cocked power handle projecting through slot 152 is depressed firing the power handle, detonating a cartridge loaded in the head of the power handle and explosively launching the dummy 168 mounted on the launching arm.

A number of methods can be used to avoid unintended firing of the launchers described herein by stray radio signals in the environment. First of all using the very high frequency hobby band eliminates considerable conflict. In addition, a code might be used such as a frequency code or digital code. Thus, double frequency coding or gating may be used such that two transmitted frequencies are required to actuate the solenoid. Or, digital coding may be incorporated into the system as is now commonly available for garage door remote control transmitter/receiver opening systems.

We claim:

1. A remote control dummy launcher for training retrieving dogs using a power handle of the type formed with a cartridge chamber, firing pin means, means for actuating the firing pin means for firing a blank cartridge placed in the cartridge chamber, and a launching arm designed for explosive release of gas from a blank cartridge for launching a dummy mounted on the launching arm comprising:
   housing means for supporting said power handle with the launching arm directed away from said housing;
   a plurality of legs coupled to said housing to provide a stable base for the housing and for directing the power handle launching arm at a desired angle from the horizontal;
   means mounted to said housing for controlling and releasing the firing pin actuating means of said power handle comprising solenoid means having an armature and means coupled to said armature for engaging the firing pin actuating means;
   whereby a dummy mounted on the launching arm may be explosively launched by a transmitted signal from a remote location by controlling current to said solenoid means in response to the transmitted signal.

2. A remote control dummy launcher as set forth in claim 1 wherein is also provided radio receiver output circuit means for controlling current from a power supply to said solenoid means.

3. A remote control dummy launcher as set forth in claim 2 wherein said radio receiver output circuit means comprises:
   timed circuit means including capacitive means for conducting during the time interval of charging or discharging of the capacitive means when a signal is received, said timed circuit otherwise blocking direct current;
   and relay means responsive to said time circuit for accessing current to the solenoid of the remote control dummy launcher during said time interval.

4. A system of a plurality of remote control dummy launchers each as set forth in claim 1 wherein is also provided radio receiver output circuit means comprising:
   shift register means responsive to received radio signals for sequentially registering said signals;
   current control means responsive to registered signals from said shift register for sequentially controlling current to the solenoids of successive remote control dummy launchers of said plurality;
   thereby enabling sequential launching of dummies from said plurality of dummy launchers by transmissions from a remote location.

5. Radio receiver output circuit means for controlling a system of a plurality of remote control solenoid actuated power handle dummy launchers comprising:
   shift register means comprising a plurality of flip-flops in number at least equal to the number of remote control dummy launchers to be controlled by said radio receiver output circuit, said shift register coupled to receive and sequentially respond to the output signals from a radio receiver;
   timed circuit means coupled to the output of the flip-flops of said shift register means, said timed circuit means including capacitive means for conducting during the time interval of charging or discharging of the capacitive means when a signal is received from a flip-flop of the shift register said timed circuit means otherwise blocking direct current;
   and means responsive to said timed circuit means for accessing current to the respective solenoids of the remote control dummy launchers of the system during said time intervals;
   whereby dummies mounted on the plurality of launchers may be explosively launched in sequence by transmitted signals from a remote location by controlling current to the respective solenoid means in response to the transmitted signals.

6. A remote control dummy launcher for training retrieving dogs using a power handle of the type formed with a cartridge chamber, spring loaded retractable firing pin striker means for firing blank cartridges placed in the cartridge chamber, and a launching arm designed for explosive discharge of gas from a blank cartridge for launching a dummy mounted on the launching arm comprising:
   housing means supporting the power handle with launching arm directed away from the housing;
   a plurality of legs coupled to said housing to provide a stable base for the housing and for directing the power handle launching arm at a desired angle from the horizontal;
   first latch means connected to the end of the spring loaded firing pin striker means of the power handle, said latch means formed with an extension for applying finger or hand pressure to retract the firing pin striker means;

solenoid means coupled to said housing, said solenoid means having an extending armature;

second latch means complementary to the first latch means for engaging the first latch means and holding the spring loaded firing pin striker means in a cocked position when the firing pin striker means is retracted;

coupling means coupling the second latch means to said solenoid means armature;

said second latch means, coupling means and solenoid armature coupled to release the first latch means and firing pin striker means upon actuation of the solenoid for firing a cartridge placed in the cartridge chamber and launching a dummy mounted on the launching arm.

7. A remote control dummy launcher as set forth in claim 6 wherein said coupling means comprises pivot arm means pivotally coupled at one end to the ends of the solenoid armature at substantially a right angle and wherein the second latch means is formed on the other end of the pivot arm means at substantially a right angle, whereby retraction of the solenoid armature by the solenoid causes the second latch means to pivot out and away thereby releasing the first latch means and firing pin striker means.

8. A remote control dummy launcher as set forth in claim 6 wherein at least two legs are pivotally mounted to the housing for variably adjusting the attitude of the housing and supported power handle for firing at different angles.

9. A remote control dummy launcher as set forth in claim 6 wherein the plurality of legs form a stable tripod base for the dummy launcher and wherein one of said tripods is formed by double legs rigidly connected to and extending from the housing thereby forming an extension of the housing for mounting components in relation to the housing.

10. A remote control dummy launcher as set forth in claim 6 wherein is also included radio receiver output circuit means for controlling a power supply to said solenoid means using a radio receiver of the type having an electromechanical servo output, said radio receiver output circuit comprising:

micro-switch means responsive to the servo output of the radio receiver;

timed circuit means including capacitive means providing current during a timed interval of charging or discharging and otherwise blocking direct current;

and relay means responsive to said timed interval of current to deliver current from the power supply during said interval to the solenoid means thereby launching a dummy mounted on the remote control dummy launcher.

11. A remote control dummy launcher as set forth in claim 6 wherein is also included radio receiver output circuit means for controlling a power supply to said solenoid using a radio receiver having a transistor output comprising:

timed circuit means including capacitive means providing current during a timed interval of charging or discharging and otherwise blocking direct current;

and a Darlington current source responsive to said timed circuit means for delivering current during said timed interval to said solenoid means and actuating said solenoid means thereby firing a cartridge placed in the cartridge chamber and launching a dummy mounted on the launching arm.

12. Radio receiver output circuit means for controlling a system of a plurality of solenoid actuated remote control power handle dummy launchers using a radio receiver with an electromechanical servo output comprising:

micro-switch means coupled to the servo output of said radio receiver;

set-reset flip-flop debounce circuit means for filtering the output of said micro-switch means;

shift register means comprising a plurality of flip-flops in number at least equal to the number of remote control dummy launchers, said shift register coupled to receive and sequentially respond to the output of the set-reset debounce circuit means;

timed circuit means coupled to the output of the flip-flops of the shift register means, said timed circuit means including capacitive means for conducting during the time interval of charging or discharging of the capacitance when a signal is received from a flip-flop of the shift register and otherwise blocking direct current;

and a plurality of relays responsive to the outputs from said timed circuit means for accessing current to the solenoids of the respective remote control power handle launchers of the system during timed intervals;

whereby dummies mounted on the plurality of launchers may be explosively launched in sequence by transmitted signals from a remote location by controlling current to the respective solenoid means in response to the transmitted signals.

13. Radio receiver output circuit means for controlling a system of a plurality of remote control solenoid actuated power handle dummy launchers using a radio receiver with a transistor output comprising:

shift register means comprising a plurality of flip-flops in number at least equal to the number of remote control dummy launchers to be controlled by said radio receiver output circuit, said shift register coupled to receive and sequentially respond to the output signals from said radio receiver;

timed circuit means coupled to the output of the flip-flops of said shift register means, said timed circuit means including capacitive means for conducting during the time interval of charging or discharging of the capacitive means when a signal is received from a flip-flip of the shift register and otherwise blocking direct current;

and means responsive to said timed circuit means for accessing current to the respective solenoids of the remote control power handle launchers of the system.

14. Radio receiver output circuit means as set forth in claim 13 wherein said means for accessing current to the respective solenoids comprises a plurality of Darlingtons coupled to sink current from a power supply through said solenoids.

15. A remote control dummy launcher for training retrieving dogs using a power handle of the type formed with a cartridge chamber, firing pin striker mechanism, means for cocking the firing pin striker mechanism, trigger means mounted on the side of the power handle for releasing the cocked firing pin striker mechanism and firing a blank cartridge placed in the cartridge chamber when the trigger is depressed, and a launching arm designed for explosive release of gas from a blank cartridge for launching a dummy mounted on the launching arm comprising:

elongate tubular housing means open at the upper end for slideably receiving a power handle with the launching arm directed away from the housing, said elongate tubular housing formed with a longitudinal slot at the upper end of the housing to accomodate the trigger means on the side of the power handle so that the trigger means is accessible from the side of the housing;

a plurality of legs coupled to said housing to provide a stable base for the housing and for directing the power handle lainching arm at a desired angle from the horizontal;

and means for depressing the trigger means of the power handle comprising solenoid means with projecting armature, said solenoid means mounted to the housing, pushing means pivotally mounted to the housing and aligned with the slot in the housing and the trigger of a power handle slidably received into the housing, and means coupling the pusher means and solenoid armature whereby the pusher means depresses the trigger upon actuation of the solenoid for firing a cartridge placed in the cartridge chamber and launching a dummy mounted on the launching arm.

16. A remote control dummy launcher as set forth in claim 15 wherein is also provided radio receiver output circuit means for controlling current from a power supply to said solenoid means in response to a signal transmitted from a remote location.

17. A remote control dummy launcher as set forth in claim 16 wherein said radio receiver output circuit means comprises:

timed circuit means including capacitive means for conducting during the time interval of charging or discharging of the capacitive means when a signal is received, said timed circuit otherwise blocking direct current;

and relay means responsive to said time curcuit for accessing current to the solenoid of the remote control dummy launcher during said time interval.

18. A system of a plurality of remote control dummy launchers each as set forth in claim 15 wherein is also provided radio receiver output circuit means comprising:

shift register means responsive to received radio signals for sequentially registering said signals;

current control means responsive to registered signals from said shift register for sequentially controlling current to the solenoids of successive remote control dummy launchers of said plurality;

thereby enabling sequential launching of dummies from said plurality of dummy launchers by transmissions from a remote location.

19. A remote control dummy launcher as set forth in claim 15 wherein is also included radio receiver output circuit means for controlling a power supply to said solenoid means using a radio receiver of the type having an electromechanical servo output, said radio receiver output circuit comprising:

micro-switch means responsive to the servo output of the radio receiver;

timed circuit means including capacitive means providing current during a timed interval of charging or discharging and otherwise blocking direct current;

and relay means responsive to said timed interval of current to deliver current from the power supply during said interval to the solenoid means thereby launching a dummy mounted on the remote control dummy launcher.

20. A remote control dummy launcher as set forth in claim 15 wherein is also included radio receiver output circuit means for controlling a power supply to said solenoid using a radio receiver having a transistor output comprising:

timed circuit means including capacitive means providing current during a timed interval of charging or discharging and otherwise blocking direct current;

and a Darlington current source responsive to said timed circuit means for delivering current during said timed interval to said solenoid means and actuating said solenoid means thereby firing a cartridge placed in the cartridge chamber and launching a dummy mounted on the launching arm.

* * * * *